United States Patent [19]

Dettbarn

[11] Patent Number: 5,233,818
[45] Date of Patent: Aug. 10, 1993

[54] SHOCK ABSORBING MOTOR MOUNT FOR A ROTARY CUTTER

[76] Inventor: Deke Dettbarn, 168 Ray Blvd., Thunder Bay, Ontario, Canada, P7C 4B7

[21] Appl. No.: 813,904

[22] Filed: Dec. 23, 1991

[30] Foreign Application Priority Data

Dec. 24, 1990 [CA] Canada ................... 2033108

[51] Int. Cl.⁵ .......................................... A01D 34/82
[52] U.S. Cl. ....................... 56/12.6; 56/16.7; 56/306; 248/665; 248/900
[58] Field of Search ............. 56/16.7, 12.6, 13.6, 56/15.7, 292, 306, DIG. 22; 248/665, 666, 900

[56] References Cited

U.S. PATENT DOCUMENTS

| | | | |
|---|---|---|---|
| 2,911,700 | 11/1959 | Wieland | 248/665 X |
| 3,058,281 | 10/1962 | Lewis | 56/12.6 X |
| 4,027,463 | 6/1977 | Takahashi et al. | 56/17.5 X |
| 4,232,486 | 11/1980 | Rampe | 51/164.1 |
| 4,472,980 | 9/1984 | Wadensten | 74/61 |
| 4,877,987 | 10/1989 | Flaig et al. | 310/209 |
| 4,880,336 | 11/1989 | Thomas et al. | 405/198 |
| 4,998,948 | 3/1991 | Osterling | 56/16.7 X |

*Primary Examiner*—Terry Lee Melius
*Attorney, Agent, or Firm*—Andrus, Sceales, Starke & Sawall

[57] ABSTRACT

A shock absorbing motor mount for heavy duty rotary cutting machines equipped with a frame and a hydraulic motor, or the like, mounted on the frame for driving a rotating cutting blade is disclosed. The shock absorbing motor mount includes a bearing for rotatably mounting the motor to the frame and a torsion arm for limiting the rotation of the motor with respect to the frame to permit an effective transfer of drive force from the motor to the cutting blade while maintaining the motor in a neutral position. The torsion arm includes a resilient shock absorber such as a compression spring mounted on one end of the torsion arm for progressively decelerating the rotation of the motor when the cutting blade strikes an object that possesses sufficient inertia to induce a rotation of the motor with respect to the frame, and returns the motor to the neutral position after the impact.

11 Claims, 3 Drawing Sheets

SHOCK ABSORBING MOTOR MOUNT FOR A ROTARY CUTTER

FIELD OF THE INVENTION

The invention relates to motor mounts for rotating machinery and in particular to a shock absorbing motor mount for heavy duty rotary cutting machines.

BACKGROUND OF THE INVENTION

Rotary cutting machines generally include a frame which supports one or more horizontally rotatable cutter blades, a shroud for covering the blades and directing the flow of cut material, and means for rotating the blades to achieve a cutting action. Small rotary cutting machines such as riding lawn mowers and the like generally have belt driven cutting blades. Some large grass cutting machines designed to be towed behind a tractor vehicle are driven directly from a power take-off shaft. For heavy duty rotary cutting machines intended for cutting coarse weeds, brush and small trees, however, an independent power source for each cutter is generally required to generate the torque for maintaining a high speed of rotation while cutting coarse material. Heavy duty rotary cutting machines are therefore commonly equipped with a hydraulic motor or the like for driving each cutting blade. If the cutting blade of such a machine strikes an object possessing considerable inertia, a tremendous amount of torque is generated, inducing significant stress in the points of connection between the motor and the frame of the machine. Such torque may be sufficient to damage the motor and/or shear its connection with the frame. To prevent such damage, cotter pins or torque reducing slip couplings have been used to connect the driving shaft to the cutting blade. However, it is a disadvantage of such a construction that the connection between the motor and the cutter frame is still subjected to torque shocks each time the rotating cutting blade strikes an object possessing sufficient inertia to induce rotation of the motor with respect to the frame. Repeated torque shocks may contribute to fatigue of the connection and ultimately to damage of the machine. Furthermore, the operation of the rotary cutting machine must be stopped each time a broken cotter pin requires replacement.

Thus, there is a recognized need for a motor mount capable of absorbing the torque shock created when a rotating cutting blade strikes an object possessing considerable inertia, in order to prevent damage to the motor, the shaft or the cutter frame and to permit continuous operation of the rotary cutter.

Shock absorbing motor mounts for hydraulic motors are known. A shock absorbing motor mount for a hydraulic motor used in a tumbler-type finishing machine is taught in U.S. Pat. No. 4,232,486 issued to John F. Rampe. The tumbler machine includes a drum which is rotatably mounted to a supporting framework by a drive shaft journaled through a thrust bearing. A hydraulic motor is rigidly affixed to a free end of the drive shaft. A rotation of the motor housing with respect to the supporting framework is prevented by a number of shock absorbing torsion rods which extend tangentially from the housing and connect the motor with the supporting framework. Each of the rods is pivotally connected to the motor on their one end, while the other end extends through a bore in the supporting framework. The other end of each rod is resiliently connected to the supporting framework by opposed helical springs. The springs are coaxial with the rod and are positioned on each side of the framework. They are tensioned between the supporting framework and appropriate spring retainers mounted on the rod. The housing of the motor is not directly attached to the supporting frame structure. This shock absorbing arrangement may work well for a slowly rotating tumbler-type machine, because the shock absorber is only employed for minimizing the transmission of transient loads and shocks from the drum to the supporting framework, since extreme torque shocks are not commonly generated in such tumbler machines. However, if used on a heavy duty cutter rotating at high speed, a shock absorbing motor mount as described by Rampe could cause excessive vibration of the motor that could result in damage to the shaft, especially if the rotating blade were to strike an object possessing significant inertia.

SUMMARY OF THE INVENTION

These disadvantages are overcome by a shock absorbing motor mount in accordance with the invention, wherein the motor is rotatably mounted to a rotary cutter frame to provide a direct connection therebetween and it is retained in a neutral position by a rotation limiting and shock absorbing apparatus which connects the motor housing with the rotary cutter frame.

Accordingly, the invention provides a shock absorbing motor mount for use in a rotary cutter having a frame, a motor and a rotatable cutting blade affixed to a shaft driven by the motor, including a bearing means for rotatably mounting the motor to the frame to permit rotation of the motor with respect to the frame, and a rotation limiting means for limiting the rotation of the motor with respect to the frame to permit an effective transfer of power from the motor to the cutting blade and to normally maintain the motor in a neutral position, the rotation limiting means including a resilient shock absorbing means for progressively decelerating a rotation of the motor when the cutting blade strikes an object which possesses sufficient inertia to induce a rotation of the motor with respect to the cutter frame, and for returning the motor to the neutral position when the cutting blade is free to rotate.

In a preferred embodiment of a shock absorbing motor mount in accordance with the invention, the bearing means includes a first bearing assembly for rotatably mounting a first end of the motor to the cutter frame and a second bearing assembly for rotatably mounting the opposite end of the motor to a bracket which is rigidly affixed to the cutter frame.

BRIEF DESCRIPTION OF THE DRAWINGS

The invention will now be further described by way of example only and with reference to the following drawings, wherein.

DETAILED DESCRIPTION OF THE PREFERRED EMBODIMENT

Figure 1:
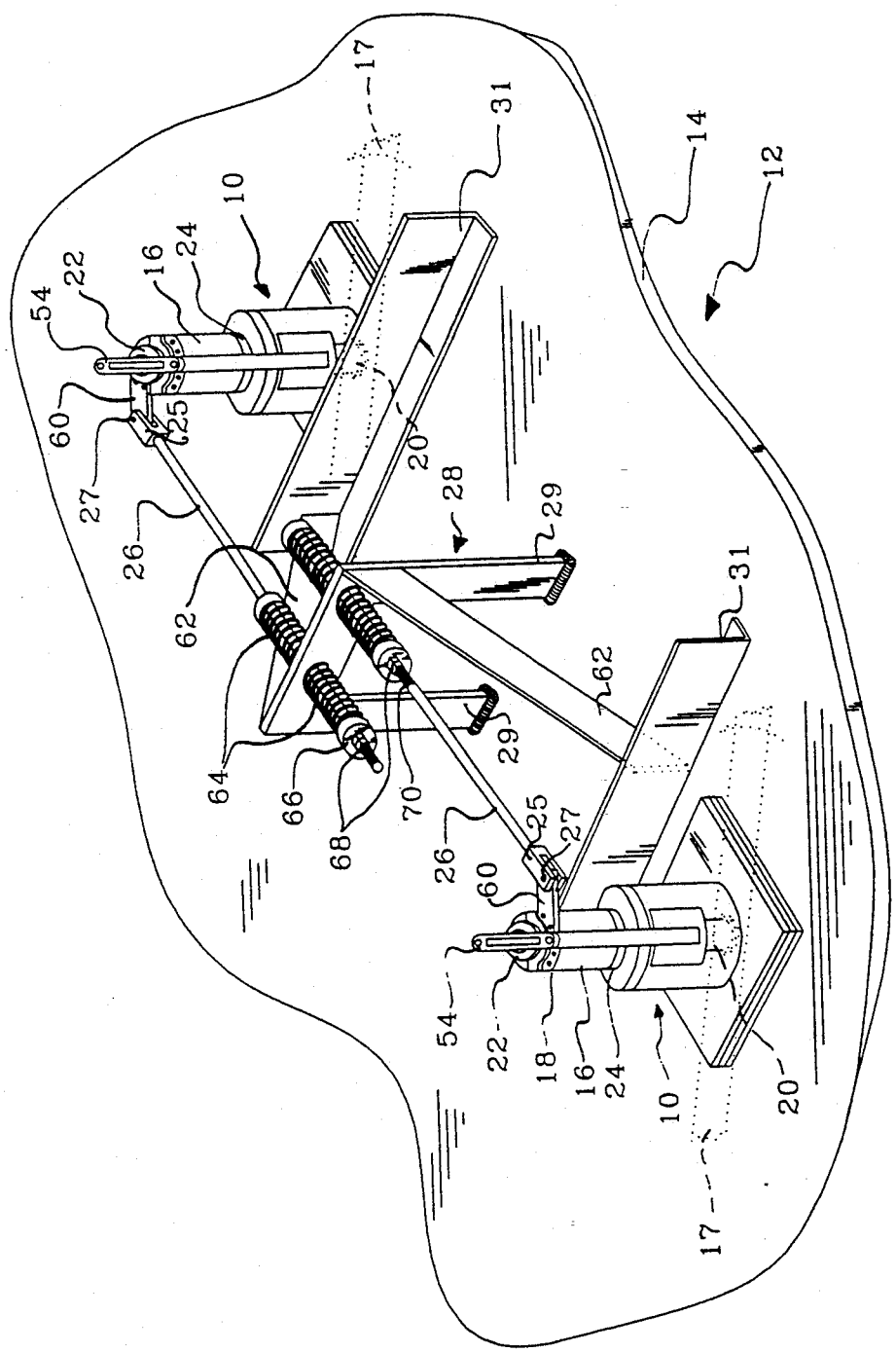
FIG. 1 is a rotary cutter having two hydraulic motors mounted by a shock absorbing motor mount in accordance with the present invention.

FIG. 1 shows a portion of a rotary cutting machine equipped with shock absorbing motor mounts in accordance with the invention, hereinafter generally referred to by reference numeral 10. The motor mount 10 is mounted on a heavy duty rotary cutter 12. The rotary cutter 12 may be fastened to the three point hitch of an appropriate tractor or may be an integral part of a tow-behind or self-propelled rotary cutter vehicle. Rotary cutter 12 includes a frame 14, motors 16 and rotatable cutting blades 17 which are affixed to vertical shafts 20. The motor 16 is rotatably mounted to the cutter frame 14 with a bearing means, preferably first and second bearing assemblies 22, 24, which permit the motors 16 to rotate with respect to the cutter frame 14. The rotation of motors 16 is limited by a rotation limiting means, preferably torsion arms 26, which resiliently connect the motors 16 with the cutter frame 14 in a manner described below. The motors 16 are preferably hydraulic motors. The hydraulic fluid hoses for conducting pressurized hydraulic fluid to and from motors 16 are not illustrated for reasons of clarity. However, a person skilled in the art of rotary cutters will readily appreciate that the hydraulic fluid must be conducted to and from the motor through flexible hoses which are of sufficient length to follow the limited rotation of the motor with respect to the cutter frame which is permitted by the rotation limiting means.

Figure 2:
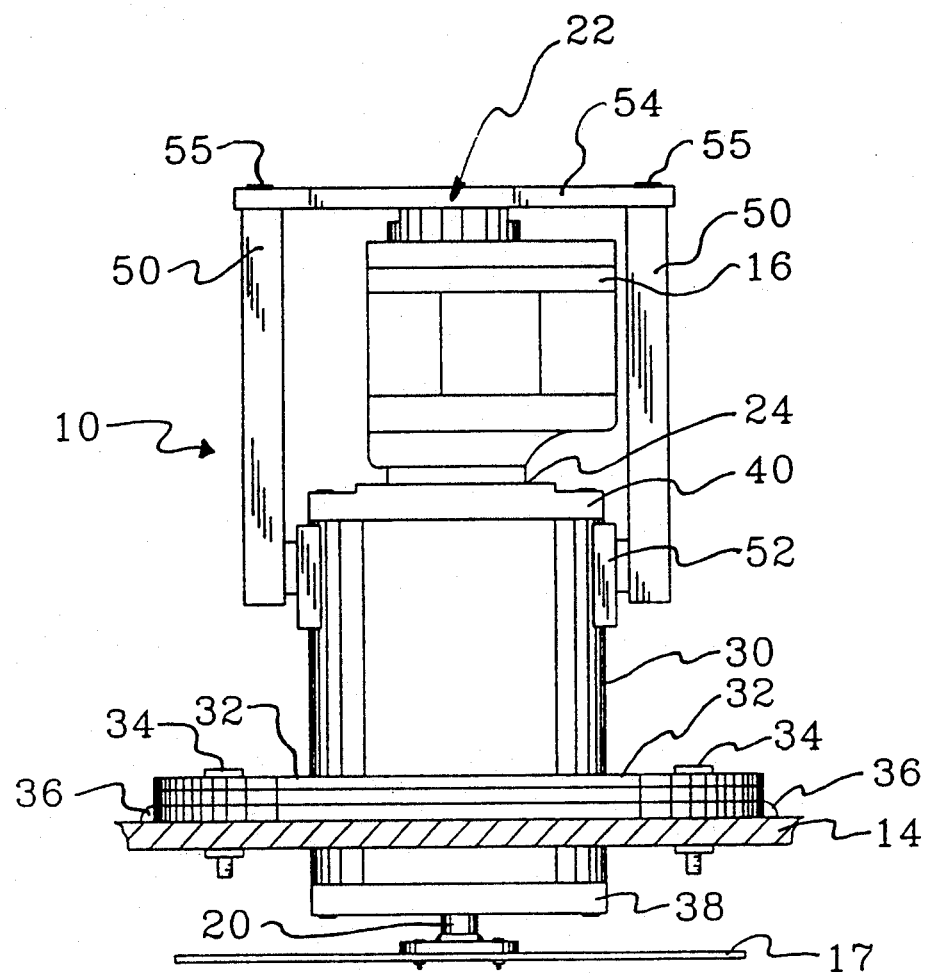
FIG. 2 is a side elevational view of one motor and motor mount shown in FIG. 1.
Figure 3:
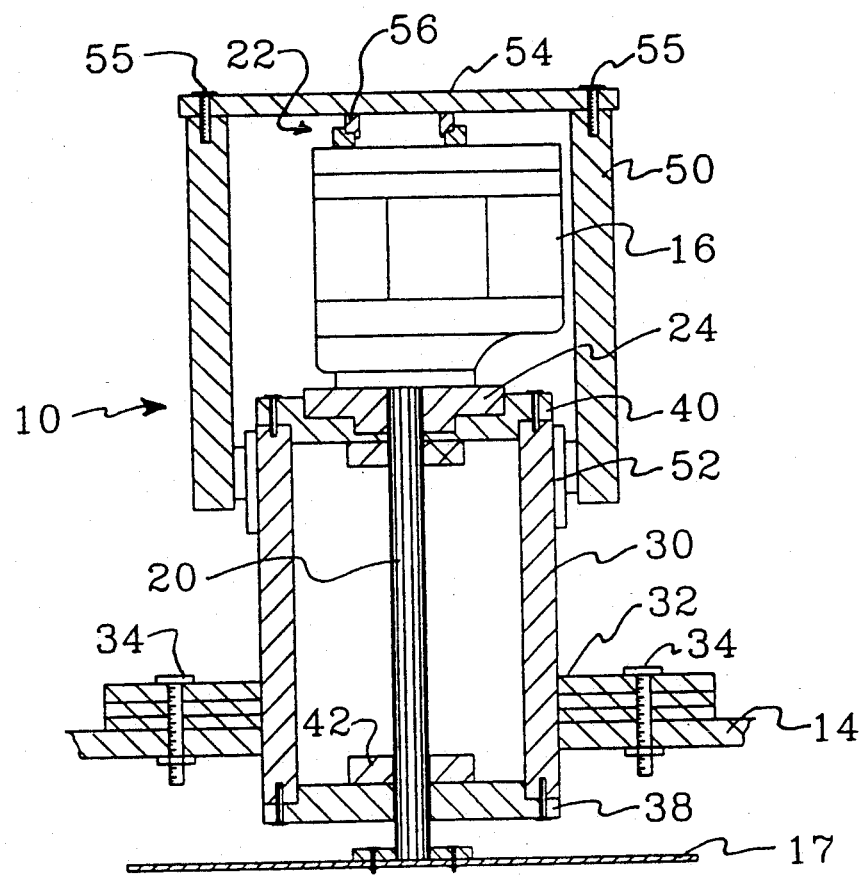
FIG. 3 is an axial cross-section through the motor and motor mount shown in FIG. 2.

As shown in FIGS. 2 and 3, shock absorbing motor mount 10 includes a hollow, cylindrical motor stand 30 which is mounted to frame 14 by a number of flange plates 32. The flange plates 32 are affixed to frame 14 with fasteners 34, preferably rivets or bolts, or by a welded joint 36. The upper and lower ends of the motor stand 30 are closed by end plates 40 and 38 respectively. The end plates 38, 40 respectively include bearings 42, 44 (see FIG. 3) which accommodate shaft 20. Upper end plate 40 houses a first bearing assembly 24 which permits the rotation of motor 16 with respect to the motor stand 30. Two diametrically opposed struts 50 are welded to reinforcing plates 52 on the outer surface of motor stand 30. Struts 50 extend parallel to the length of motor 16. The top ends of struts 50 are interconnected by a bracket 54 affixed thereto by studs 55 or by a welded bead. A second bearing assembly 22 is disposed between bracket 54 and the upper end of the motor 16. The second bearing assembly 22 includes a bearing 56 (see FIG. 3) disposed between the motor 16 and the bracket 54. The combination of the bearing assemblies 22 and 24 permits the motor 16 to rotate with respect to the cutter frame 14.

With reference again to FIG. 1, the torsion arm 26 includes a yoke 25 on its one end which is pivotally connected by a pin 27 to a torsion bracket 60 that is bolted to the upper end of the motor 16. The opposite end of the torsion arm 26 slidably extends through a bore (not illustrated) in a U-shaped supporting bracket 28. The legs 29 of the U-shaped supporting bracket 28 are welded to the frame 14. The supporting bracket 28 is inhibited from tilting by a pair of diagonal braces 62 which extend from the opposed upper corners of the supporting bracket to angle-irons 31, which are welded to the frame 14. A helical compression spring 64 is positioned over torsion arm 26 on each side of the supporting bracket 28. Springs 64 are in compression between the supporting bracket 28 and a spring retaining means, preferably a spring retaining disk 66 which is adjustably retained on the torsion arm 26 by nuts 68 that engage a threaded end portion 70 of the torsion arm. Thus, motor 16 is retained in a neutral position as shown in FIG. 1 when no significant torque is transmitted from the motor to the cutting blade or vice versa. Motor 16 may be rotated in bearing assemblies 22, 24 in either direction against the force of the respective helical compression springs 64.

The rotary cutter 12 is operated with the blade 17 rotating at a high speed and considerable force. Thus, if the rotation of blade 17 impacts a solid object possessing significant inertia (not illustrated), a great deal of torque is transmitted to the motor 16 through the shaft 20. This causes the motor 16 to rotate in a direction opposite to the direction of the rotation of blade 17. The rotation of motor 16 simultaneously translates into a displacement of torsion arm 26 through the bore in supporting bracket 28 and the compression of one of the helical springs 64. Thus, there is a progressive deceleration of the rotation of the motor 16, which contributes to the prevention of damage to the motor 16, the shaft 20, and cutting blade 17. When the cutting blade 17 is again freely rotatable or the motor 16 is deenergized, the motor is returned to the neutral position by torsion arm 26 through the rebalancing of force on the helical compression springs 64.

It will be readily apparent to a person skilled in the art that the shape of flange plates 32 and motor stand 30 is purely a matter of design choice. Furthermore, motor stand 30 may be completely eliminated and the bearing assembly 24 and struts 50 (see FIGS. 2 and 3) may be directly affixed to the frame 14. In addition, torsion arm 26 may be provided with damping means to prevent a resonance reinforced reciprocating movement of the torsion arm at the resonance frequency of the torsion arm and coil spring assembly. Torsion arm 26 preferably extends tangentially to motor 16 but may extend at any angle appropriate for the effective deceleration of the rotation of the motor when the rotating blade strikes a heavy solid object. Torsion bracket 60 may be an integral part of the motor 16. The shaft 20 preferably includes a torque limiting safety coupling, to prevent damage to the shaft or the motor in case the shock absorbing motor mount 10 is rendered temporarily nonfunctional by reason of, for example, a broken spring 64, a jammed torsion arm 26 or a seized bearing assembly 22, 24.

A shock absorbing motor mount for a heavy duty rotary cutter is therefore provided which substantially prevents damage to the motor, the shaft and the frame of a rotary cutter or any connections therebetween, when the rotating cutter blade strikes a solid object possessing significant inertia.

It is to be understood that the specific embodiments of the invention hereinbefore described are intended to be exemplary only. Changes and modifications to the specific embodiments can be made without departing from the scope of the invention which is intended to be limited only by the scope of the appended claims.

I claim:

1. A shock absorbing motor mount for use in a rotary cutter having a frame, a motor and a rotatable cutting blade affixed to a shaft driven by the motor, comprising:

means for rotatably mounting the motor to the frame to permit rotation of the motor with respect to the frame; and means for limiting the rotation of the motor with respect to the frame to permit an effective transfer of power from the motor to the cutting blade and to maintain the motor in a normal neutral position; said means for limiting the rotation of the motor including a resilient shock absorbing means for progressively decelerating a rotation of the motor resulting when said cutting blade strikes a solid object having sufficient inertia to induce a rotation of the motor with respect to the frame, and for returning the motor to the neutral position.

2. A shock absorbing motor mount as defined in claim 1, wherein said means for rotatably mounting the motor to the frame includes first and second bearing assemblies for rotatably mounting respective first and second axial ends of the motor to the frame.

3. A shock absorbing motor mount as defined in claim 1, wherein said rotation limiting means includes a torsion arm having two ends, one end being pivotally connected to the motor and the other end being resiliently connected with the frame.

4. A shock absorbing motor mount as defined in claim 3, wherein said other end of the torsion arm slidably extends through a bore formed in a supporting bracket rigidly affixed to the cutter frame.

5. A shock absorbing motor mount as defined in claim 4, wherein compression springs are positioned over said other end of the torsion arm on each side of the supporting bracket and are each compressed between the supporting bracket and a means for retaining the compression spring mounted on said other end of the torsion arm.

6. A shock absorbing motor mount as defined in claim 5, wherein said other end of the torsion arm is threaded and the spring retaining means comprises a spring retaining disk adjustably retained on the torsion arm by at least one nut which engages a threaded portion on said other end of the torsion arm.

7. A shock absorbing motor mount as defined in claim 2, further including an elongated, hollow motor stand affixed to the cutter frame, a first end plate mounted to one end of the motor stand and including the first bearing assembly and a second end plate mounted to the other end of the motor stand, the end plates each including a bore to accommodate the shaft.

8. A shock absorbing motor mount as defined in claim 7, wherein the first and second end plates each further include a bearing for the shaft.

9. A shock absorbing motor mount as defined in claim 7, wherein the motor stand has a flange plate for mounting the motor stand to the frame.

10. A shock absorbing motor mount for use in a rotary cutter having a frame, a motor and a rotatable cutting blade affixed to a shaft driven by the motor, comprising:
first and second bearings for respectively rotatably mounting a first and second axial end of the motor to the frame;
a torsion arm interconnecting the motor with the frame for limiting the rotation of the motor with respect to the frame to permit an effective transfer of drive force from the motor to the cutting blade and to maintain the motor in a normal neutral position;
said torsion arm extending tangentially to the motor and including a resilient shock absorbing means for progressively decelerating a rotation of the motor resulting when the cutting blade strikes a solid object having sufficient inertia to induce a rotation of the motor with respect to the frame, and for returning the motor to the neutral position;
said resilient shock absorbing means including a pair of compression springs positioned over the torsion arm at a position remote from the motor and to each side of a supporting bracket integral with said frame, said torsion arm extending through the supporting bracket and each compression spring being compressed between the supporting bracket and a means for retaining the spring mounted on the torsion arm.

11. A rotary cutter, comprising:
a frame;
a motor;
a rotatable cutting implement affixed to a shaft driven by the motor; and
a shock absorbing motor mount, including
a means for rotatably mounting the motor to the cutting frame to permit rotation of the motor with respect to the frame; and
means for limiting the rotation of the motor with respect to the frame to permit an effective transfer of power from the motor to the cutting blade and to maintain the motor in a normal neutral position;
said means for limiting the rotation of the motor including a resilient shock absorbing means for progressively decelerating a rotation of the motor which results when the cutting blade strikes a solid object which has sufficient inertia to induce a rotation of the motor with respect to the frame, and for returning the motor to the neutral position.

* * * * *